Patented Aug. 22, 1944

2,356,683

UNITED STATES PATENT OFFICE 2,356,683

CYCLO-POLYMETHYLENO-META-DIOXANES

Louis A. Mikeska, Westfield, and Erving Arundale, Colonia, N. J., assignors to Standard Oil Development Company, a corporation of Delaware No Drawing. Application August 3, 1940, Serial No. 351,150

11 Claims. (Cl. 260—338)

The present invention relates to the products obtained by condensing cyclic olefins and diolefins with aldehydes and to the method of bringing about such condensations. The products prepared according to this invention are useful as solvents and as intermediates in the synthesis of further chemical compounds.

According to the present invention, cyclic olefins and aldehydes are condensed in the presence of acid-acting condensation catalysts. Cyclic olefins, such as cyclopentene, cyclohexene, cycloheptene, etc., alkylated cyclic olefins, such as methyl cyclopentene, ethyl cyclohexene, etc., otherwise substituted cyclic olefins, such as halogenated cyclic olefins as, for example, chlorocyclohexene, and cyclic diolefins and their derivatives, form the olefinic starting materials for this condensation reaction. The aldehyde may be aliphatic, such as formaldehyde (formalin), acetaldehyde, propionaldehyde, or aromatic, such as benzaldehyde; or, any compound, such as trioxymethylene, paraldehyde, other polymers or formaldehyde or acetaldehyde, methylal or other acetals, which will decompose to yield an aldehyde, may be used. The catalyst usually employed is sulfuric acid of from 5 to 95% concentration, although other acids and acid-acting materials such as sulfurous, phosphoric, phosphorous, fluorsulfonic, fluosilicic, dihydroxyfluoboric, and hydrofluoboric acids, and $BF_3.H_2O$ complexes, or acid-acting metallic salts or mineral acids, such as $NaHSO_4$, $NaH_2PO_4$, $ZnSO_4$, $Fe_2(SO_4)_3$, $Al_2(SO_4)_3$, and the like may be used. Many of the cyclic olefins react readily with aldehydes at room temperature, although temperatures as high as 150° C. or higher may be used. The use of elevated temperatures materially increases the rate of reaction. Sufficient pressure should be used to maintain the olefin in the liquid phase. For best yields, the mol ratio of aldehyde to olefin in the reaction mixture should be at least 2:1.

The principal constituent in the reaction products resulting from the process of this invention under the conditions described is a cyclic formal or acetal of a 2-hydroxy alkyl cycloalkanol (cyclopolymethyleno meta-dioxane) or a substituted derivative thereof. The term "alkyl" in the present specification is used to imply paraffinic hydrocarbon radicals of the formula $C_nH_{2n+1}$. When a cyclic diolefin is used as the cyclic olefin, the aldehyde may interact with one or both of the double bonds in the cyclic diolefin molecule to form a cycloalkeno meta-dioxane or a di-cyclopolymethyleno meta-dioxane, respectively. Cyclopentene, when condensed with formaldehyde according to the present invention, yields the cyclic formal of 2-hydroxymethyl cyclopentanol (4,5-cyclopento meta-dioxane). Cyclohexene is similarly converted to the cyclic formal of 2-hydroxymethyl cyclohexanol (4,5-cyclohexo meta-dioxane).

The following are examples of the type of compounds which can be prepared by the process of this invention:

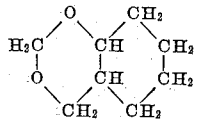

4,5-cyclohexo meta-dioxane (cyclic formal of 2-hydroxymethyl cyclohexanol) from cyclohexene and formaldehyde

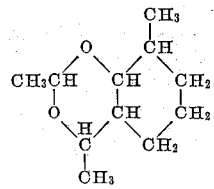

2,6-dimethyl-4,5 (methyl cyclohexo) meta-dioxane from methyl cyclohexene and acetaldehyde. (Cyclic acetal of 2-(α-hydroxy ethyl)-6-methyl cyclohexanol).

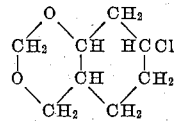

4,5-(chlorocyclohexo) metadioxane (cyclic formal of 2-hydroxymethyl-5-chlorocyclohexanol) from chlorocyclohexene and formaldehyde.

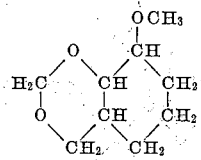

4,5-(methoxy cyclohexo) meta-dioxane (cyclic formal of 2-hydroxy methyl-6-methoxy cyclohexanol) from methoxy cyclohexene and formaldehyde.

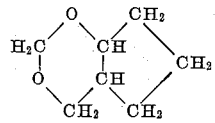

4,5-cyclopento meta-dioxane (cyclic formal of 2-hydroxymethyl cyclopentanol) from cyclopentene and formaldehyde Small amounts of cyclic diols are formed as by-products of the process of this invention. Thus, in the case of the cyclohexene-formaldehyde condensation reaction, a small amount of 2-hydroxymethyl cyclohexanol is produced. If desired, the ratio of cyclic diol to meta-dioxane in the reaction products can be increased by altering the conditions of operation and/or the strength of the catalyst.

The following example is given for the purpose of illustrating but not limiting the invention:

*Example*

249 parts of cyclohexene were placed in a reactor equipped with a stirrer and reflux condenser. 90 parts of paraformaldehyde and 140 parts of 50% sulfuric acid were then added, and the mixture was stirred and heated to about 70° C. for two hours. Heating was then discontinued and the mixture was stirred for an additional two hours. The formaldehyde reacted completely. On standing, the reaction mixture separated into two layers. The reaction product (both layers) was neutralized and the neutral solution was steam distilled. The distillate formed two layers which were separated. The upper layer was dried and then fractionated, whereby 90 parts of the desired 4,5-cyclohexo meta-dioxane, along with 113 parts of cyclohexene, were recovered. This product boiled at 193°–195° C. Its chemical structure is given below:

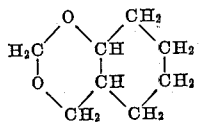

This product may also be termed the cyclic formal of 2-hydroxymethyl cyclohexanol.

What is claimed is:

1. A process for producing 4,5-cyclohexo meta-dioxane which comprises condensing cyclohexene with formaldehyde at a temperature of from 60° C. to 80° C., under a pressure sufficient to maintain the olefin in the liquid phase, and in the presence of sulfuric acid of 45–55% concentration.

2. A process for producing 4,5-cyclopento meta-dioxane which comprises condensing cyclopentene with formaldehyde at a temperature of from 60° C. to 80° C., under a pressure sufficient to maintain the olefin in the liquid phase, and in the presence of sulfuric acid of 45–55% concentration.

3. As a composition of matter, a cyclopolymethyleno meta-dioxane having only two fused rings having the formula—

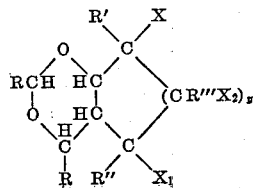

where R is hydrogen, R', R'', and R''' are selected from the group consisting of hydrogen atoms and alkyl radicals; X, $X_1$, and $X_2$ are selected from the group consisting of hydrogen and alkyl radicals; and $y$ is a positive number selected from the group consisting of 1, and 2.

4. As a composition of matter, 4,5-cyclopento meta-dioxane.

5. As a composition of matter, 4,5-cyclohexo meta-dioxane.

6. A process in accordance with claim 8 in which the acid-acting catalyst is of a concentration between 5 and 95%.

7. A process in accordance with claim 8 in which the acid-acting catalyst is sulfuric acid of from 5 to 95% concentration.

8. A process for producing cyclo-polymethyleno meta-dioxanes which comprises condensing a compound chosen from the class consisting of 5 and 6 membered mono-cyclo-aliphatic, mono-olefinic hydrocarbons, the olefinic linkage of which is in the ring with formaldehyde in the presence of an acid-acting catalyst and recovering cyclo-polymethyleno metadioxanes.

9. A process for producing cyclo-polymethyleno meta-dioxanes which comprises condensing 5 and 6 membered mono-cyclo-aliphatic, mono-olefinic hydrocarbons, the olefin linkage of which is in the ring with formaldehyde at a temperature of from 15° to 150° C., under a pressure sufficient to maintain the olefin in the liquid phase, and in the presence of a mineral acid of from 5–95% concentration and recovering the cyclo-polymethyleno meta-dioxanes.

10. A process for producing cyclo-polymethyleno meta-dioxanes which comprises condensing about 1 mol of a 5 and 6 membered ring mono-cyclo-aliphatic, mono-olefinic hydrocarbon, the olefin linkage of which is in the ring with about 2 mols of formaldehyde in the presence of an acid-acting catalyst of from 5–95% concentration.

11. A process for producing cyclo-polymethyleno meta-dioxanes which comprises reacting about 1 mol of a mono-cyclo-aliphatic, mono-olefinic hydrocarbon, the olefin linkage of which is in the ring with about 2 mols of formaldehyde for from 2 to 6 hours at a temperature of from 15°–150° C. under a pressure sufficient to maintain the olefin in the liquid phase and in the presence of a mineral acid of from 5–95% concentration, neutralizing the reaction mixture, and recovering the meta-dioxanes by distillation.

LOUIS A. MIKESKA.
ERVING ARUNDALE.